(12) United States Patent
Kim et al.

(10) Patent No.: US 7,929,199 B2
(45) Date of Patent: Apr. 19, 2011

(54) ELECTROPHORETIC DISPLAY AND METHOD OF PREPARING ELECTROPHORETIC PARTICLES

(75) Inventors: Sung-Jin Kim, Seongnam-si (KR); In-Joo Chin, Goyang-si (KR); Hyoung Jin Choi, Seoul (KR); Yong Ku Kwon, Seoul (KR); Nam-Seok Roh, Seongnam-si (KR); Sang-Il Kim, Yongin-si (KR); Jae-Byung Park, Seongnam-si (KR); Son-Uk Lee, Yongin-si (KR); Jeong-Kuk Lee, Yongin-si (KR); Seong-Sik Shin, Cupertino, CA (US)

(73) Assignees: Samsung Electronics Co., Ltd., Suwon-Si (KR); Inha-Industry Partnership Institute, Incheon (KR)

( * ) Notice: Subject to any disclaimer, the term of this patent is extended or adjusted under 35 U.S.C. 154(b) by 112 days.

(21) Appl. No.: 12/268,733

(22) Filed: Nov. 11, 2008

(65) Prior Publication Data
US 2009/0284825 A1    Nov. 19, 2009

(30) Foreign Application Priority Data
May 15, 2008   (KR) .................. 10-2008-0045077

(51) Int. Cl.
*G02B 26/00*    (2006.01)
*G03G 17/04*    (2006.01)
(52) U.S. Cl. ......................................... 359/296; 430/32
(58) Field of Classification Search .................. 359/296; 345/107, 105, 48; 430/32, 34, 38, 110.1, 430/115, 137.19; 523/160; 524/504; 204/450, 600
See application file for complete search history.

(56) References Cited

U.S. PATENT DOCUMENTS

| | | | | | |
|---|---|---|---|---|---|
| 3,526,533 | A | * | 9/1970 | Moriconi et al. | 428/403 |
| 3,957,710 | A | * | 5/1976 | Rohmann et al. | 524/475 |
| 4,210,567 | A | * | 7/1980 | Kosters | 524/290 |
| 5,554,476 | A | * | 9/1996 | Landa et al. | 430/110.1 |
| 6,133,341 | A | * | 10/2000 | Kato | 523/160 |
| 6,586,606 | B2 | * | 7/2003 | Gerster et al. | 549/302 |
| 6,828,358 | B2 | * | 12/2004 | Morrison et al. | 523/160 |
| 6,924,076 | B2 | * | 8/2005 | Saiki et al. | 430/123.3 |
| 7,507,516 | B2 | * | 3/2009 | Hayashi et al. | 430/137.11 |
| 7,563,318 | B1 | * | 7/2009 | Faucher et al. | 106/496 |
| 2006/0281027 | A1 | * | 12/2006 | Makino et al. | 430/302 |
| 2008/0013155 | A1 | * | 1/2008 | Honeyman et al. | 359/296 |
| 2010/0036045 | A1 | * | 2/2010 | Huybrechts et al. | 524/507 |

FOREIGN PATENT DOCUMENTS

| | | |
|---|---|---|
| JP | 2006518483 | 8/2006 |
| JP | 20063233364 | 11/2006 |
| KR | 1020060016936 | 2/2006 |

* cited by examiner

*Primary Examiner* — Hung X. Dang
*Assistant Examiner* — Tuyen Q Tra
(74) *Attorney, Agent, or Firm* — H.C. Park & Associates, PLC

(57) ABSTRACT

Disclosed are electrophoretic particles, a method of preparing the same, and an electrophoretic display using the same. The electrophoretic particle includes a coating layer, which includes a co-polymer of styrene and heterocyclic compound, and a pigment surrounded by the coating layer. The method includes polymerizing styrene on a surface of the electrophoretic particle and polymerizing styrene and a heterocyclic compound. The electrophoretic display includes the electrophoretic particles.

18 Claims, 7 Drawing Sheets

ELECTROPHORETIC DISPLAY AND METHOD OF PREPARING ELECTROPHORETIC PARTICLES

CROSS-REFERENCE TO RELATED APPLICATION

This application claims priority from and the benefit of Korean Patent Application No. 10-2008-0045077, filed on May 15, 2008, which is hereby incorporated by reference for all purposes as if fully set forth herein.

BACKGROUND OF THE INVENTION

1. Field of the Invention

The present invention relates to electrophoretic particles used for an electrophoretic display, a method of preparing the same, and an electrophoretic display using the same.

2. Discussion of the Background

During electrophoresis, charged particles move toward an anode or a cathode due to an electric field. An electrophoretic display may display various colors when charged particles with various colors, which have been dispersed in a dispersion medium due to electrophoresis. For example, if a positive voltage is applied to an electrode, negatively charged particles move toward the electrode, so that the electrophoretic display may display a color of the negatively charged particles. If a negative voltage is applied to the electrode, positively charged particles move toward the electrode, so that the electrophoretic display may display a color of the positively charged particles.

Since the electrophoretic display may provide a higher resolution, a wider view angle, and a higher contrast ratio than other flat panel displays, the electrophoretic display may have superior readability. In addition, the electrophoretic display may have superior bistability to maintain an image displayed by the electric field even when the electric field is removed. In other words, since the image is maintained without the additional supply of external energy, power loss may be reduced. Due to the above advantages, the electrophoretic display may be adaptable for various applications such as electronic newspapers, electronic magazines, and electronic books.

However, particles existing in the electrophoretic display may coagulate over time because of colloidal instability. If the particles exist irregularly, the characteristics of an image displayed on the electrophoretic display may be degraded.

SUMMARY OF THE INVENTION

The present invention provides electrophoretic particles that may have superior dispersibility and a self-charged ability, a method of preparing the same, and an electrophoretic display using the same.

Additional features of the invention will be set forth in the description which follows, and in part will be apparent from the description, or may be learned by practice of the invention.

The present invention discloses electrophoretic particles including a pigment and a coating layer surrounding the pigment. The coating layer includes a polymerized heterocyclic compound.

The present invention also discloses a method of preparing electrophoretic particles including dispersing a pigment and a styrene monomer in a dispersion solution, polymerizing the styrene monomer on a surface of the pigment, adding a heterocyclic compound monomer in the dispersion solution, and polymerizing the styrene monomer and the heterocyclic compound monomer on the surface of the pigment.

The present invention also discloses an electrophoretic display including substrates facing each other, a micro-capsule provided between the substrates, and an electrophoretic particle in the microcapsule. Electrodes are arranged on the substrates. The electrophoretic particle includes a coating layer and a pigment coated with the coating layer. The coating layer includes a polymerized heterocyclic compound.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Although terms "first," "second," "third," etc. are used to distinguish similar elements from each other according to various exemplary embodiments of the present invention, these elements are not defined by those terms. The above terms are only used to distinguish the elements from each other.

Hereinafter, electrophoretic particles according to an exemplary embodiment of the present invention will be described.

Electrophoretic particles may include a pigment and a coating layer surrounding the pigment. The pigment is colored, and may include an inorganic pigment or an organic pigment.

The coating layer may include a co-polymer of styrene and a heterocyclic compound. The coating layer may be a random co-polymer of the styrene and the heterocyclic compound. The content of the heterocyclic compound of the coating layer may increase in an outward direction from the surface of the pigment. The heterocyclic compound may comprise a nitrogen-containing compound such as imidazole, pyrrolidone, imide, piperidine, pyridine, pyrrole, puran, thiophene, pyrazole, or pyrazine. For example, the imidazole may be 1-vinyl imidazole.

Since the coating layer may be formed by polymerizing styrene (e.g., polystyrene), the coating layer may be colorless and transparent to sufficiently represent the color of a pigment. The coating layer may have superior thermal stability and superior dispersion abilities. The pigment may have a surface with irregular morphology. However, the uniformity of the surface of the pigment may be improved due to the coating layer. Accordingly, the pigment may have stable surface characteristics. The electrophoretic particles may be positively charged by the heterocyclic compound of the coating layer.

Hereinafter, a method of preparing a coated pigment according to an exemplary embodiment of the present invention will be described.

A dispersion solution is provided. The pigment may remain undissolved in the dispersion solution. In addition, the dispersion solution may not dissolve styrene or polystyrene. The dispersion solution may be a compound having an alcohol group. For example, the dispersion solution may be ethanol.

A stabilizer may be supplied to the dispersion solution. The stabilizer prevents a pigment from coagulating in the dispersion solution. For example, the stabilizer may be a succinimide-based polymer including polyvinylpyrrolidone (PVP).

If the stabilizer has a weight ratio of about 1 weight % or less based on an amount of the dispersion solution, the stabilizer disperses pigments less. If the stabilizer has a weight ratio exceeding about 10 weight %, the viscosity may increase, so that movement of pigments in the dispersion solution may decrease. Accordingly, the stabilizer, which may have a weight ratio in the range of about 1 weight % to about 10 weight % based on an amount of the dispersion solution, may be provided in the dispersion solution. The dispersion solution having the stabilizer may be sonicated, so that the stabilizer may be uniformly dispersed in the dispersion solution.

A pigment, styrene as a first monomer, and a polymerization initiator that polymerizes the styrene, may be provided in the dispersion solution. The pigment may be colored. The pigment may include an inorganic pigment or an organic pigment. About 1 weight % to about 5 weight % of pigment may be provided based on an amount of the dispersion solution in consideration of the dispersion degree.

The polymerization initiator may be a radical initiator capable of initiating polymerization below or at a boiling point of the dispersion solution. For example, the polymerization initiator may be azobisisobutylonitrile (AIBN). If the polymerization initiator has a weight ratio of about 0.02 weight % or less based on an amount of the dispersion solution, a polymerization initiation rate may be degraded. If the polymerization initiator has a weight ratio exceeding about 0.5 weight %, the degree of polymerization may be lowered, so that a molecular weight may be reduced. Accordingly, the polymerization initiator may have a weight ratio in the range of about 0.02 weight % to about 0.5 weight % based on an amount of the dispersion solution.

The mixture including the dispersion solution, the stabilizer, the pigment, the styrene, and the polymerization initiator may be mixed at a high speed. The mixture may be stirred in a stirrer. For example, the mixture may be stirred in the dispersion solution at a speed of about 100 rpm to about 300 rpm such that particles of the mixture are dispersed in the dispersion solution.

The mixture is heated to the temperature between an initiating temperature of the polymerization initiator and a boiling point of the dispersion solution, so that styrene of the mixture may be polymerized into polystyrene. For example, the mixture may be heated to a temperature of about 50° C. to about 80° C. Since the solubility of the polystyrene for the dispersion solution is low even though the solubility of the styrene for the dispersion solution is high, the polystyrene may be phase-separated from the dispersion solution. The polystyrene may be coated around the surface of the pigment.

If the styrene is polymerized for a period of time, a heterocyclic compound, which may be a second monomer, may be provided in the mixture while maintaining the above reaction temperature. The combined amount of the first monomer (e.g., styrene) and the second monomer may be about three times an amount of the pigments. If the combined amount of the first and the second monomers is less than this, coating properties may be decreased. If the combined amount of the first and the second monomers is greater than this, the coating layer may become too thick, so that the color gamut of the pigment may be degraded. The combined amount of the monomers may be in the range of about 1.5 weight % to about 15 weight % based on an amount of the dispersion solution. The second monomer may have a weight ratio in the range of about 10 weight % to about 50 weight % based on an amount of the first monomer. For example, if an amount of the second monomer is less than about 10 weight %, charge characteristics may be degraded. If the amount of the second monomer exceeds about 50 weight %, the solubility of the coating layer for the dispersion solution may increase. For example, the heterocyclic compound may include a nitrogen-containing compound such as imidazole, pyrrolidone, imide, piperidine, pyridine, pyrrole, puran, thiophene, pyrazole, or pyrazine. For example, the imidazole may be 1-vinyl imidazole. Accordingly, a coating layer of a co-polymer including styrene and a heterocyclic compound may be formed on the surface of the pigment.

In polymerization, the styrene and the heterocyclic compound may be sequentially provided in a reaction. At the first stage of the reaction, the coating layer may include polystyrene formed on the surface of the pigment. Thereafter, if the heterocyclic compound is provided, a coating layer including the co-polymer obtained by cross-polymerizing the heterocyclic compound and the styrene, may be formed. In other words, the coating layer may include the random co-polymer of the styrene and the heterocyclic compound. The content of the heterocyclic compound may increase in an outward direction from the surface of the pigment.

The coated pigments may be cleaned using the dispersion solution. The cleaned pigments may be separated from the dispersion solution through a centrifuge. The separated pigments may be rinsed by using deionized water. The rinsed pigments may be dried through a freeze-drying scheme.

Experimental Example for Method of Preparing Electrophoretic Particle

About 5 g of polyvinylpyrrolidone (PVP) were provided as a stabilizer in a reactor containing about 200 g of ethanol. A solution including the stabilizer was processed by a sonicator for about two hours. About 5 g of color organic pigments, about 13 g of styrene, and about 0.1 g of azobisisobutylonitrile (AIBN) were provided in the solution. The solution was stirred at about a speed of 200 rpm. The solution was maintained at a temperature of about 60° C. for about six hours in order to react. Thereafter, about 5 g of 1-vinyl imidazole and about 0.1 g of azobisisobutylonitrile (AIBN) were added to the reactor. The solution including 1-vinyl imidazole and azobisisobutylonitrile was reacted at a temperature of about 60° C. for about 12 hours. In this manner, the color organic pigments were coated. The coated color organic pigments were cleaned with ethanol. After the color organic pigments were separated from the ethanol through a centrifuge, the cleaning process was repeated. Thereafter, the color organic pigments were rinsed using deionized water and subjected to a freeze-drying scheme.

Figure 1A:
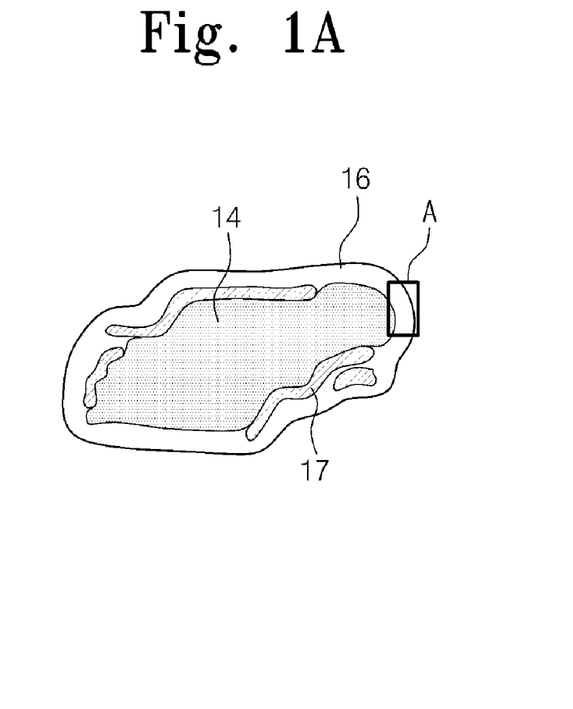
FIG. 1A is a view showing an example of an electrophoretic particle according to an exemplary embodiment of the present invention.
Figure 1B:
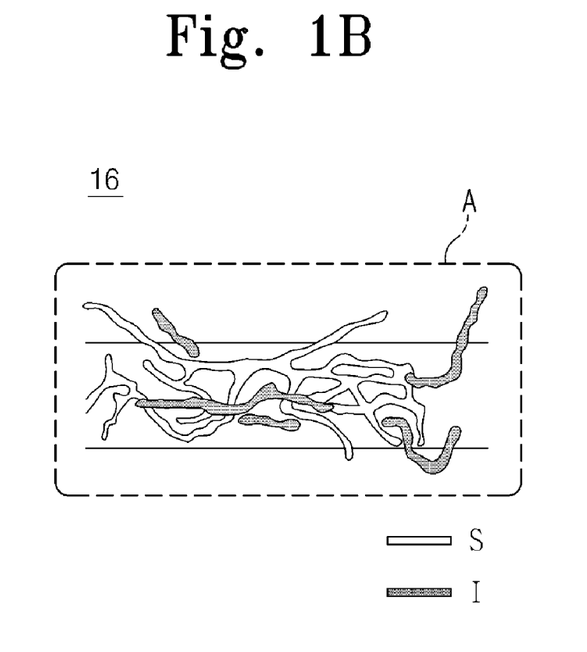
FIG. 1B is a schematic enlarged view of area A shown in FIG. 1A.

Hereinafter, the characteristics of the coated pigments according to the exemplary embodiment of the present invention will be described in comparison to pure organic pigments. FIG. 1A is a view showing an example of electrophoretic particles according to an exemplary embodiment of the present invention. FIG. 1B is a schematic enlarged view of an area of A shown in FIG. 1A.

Referring to FIG. 1A and FIG. 1B, a color organic pigment 14 is surrounded by a coating layer 16. The coating layer 16 includes a random co-polymer of styrene S and 1-vinyl imidazole I. A stabilizer 17, such as polyvinylpyrrolidone, may be randomly disposed between the color organic pigment 14 and the coating layer 16. The stabilizer 17 may be disposed between the color organic pigment 14 and the coating layer 16 during the polymerization of the co-polymer. Segments of the 1-vinyl imidazole I may be uniformly distributed throughout the coating layer 16.

Figure 2A:
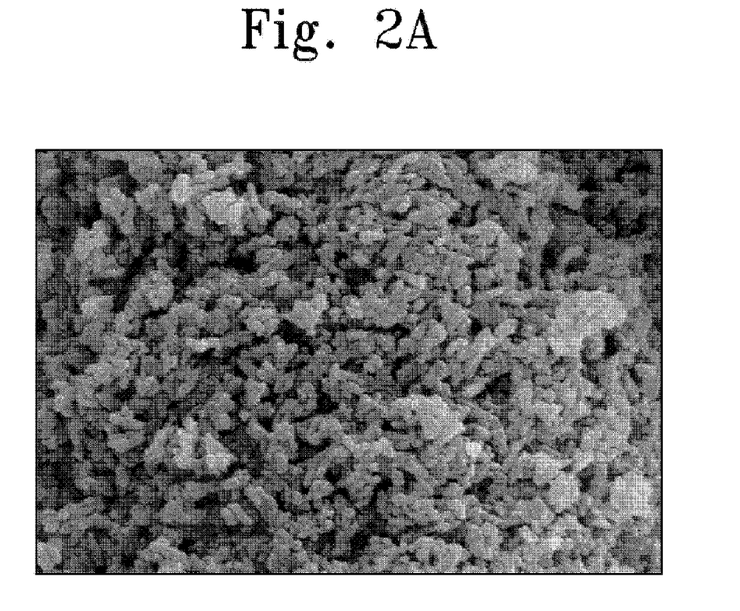
FIG. 2A and FIG. 2B show scanning electron micro-scope (SEM) photographs for pure organic pigments according to an exemplary embodiment of the present invention.
Figure 2B:
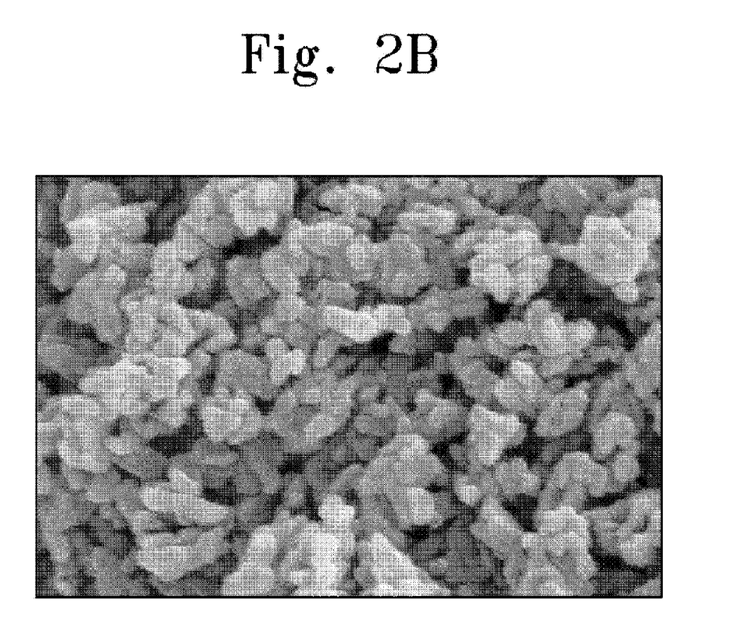
Figure 3A:
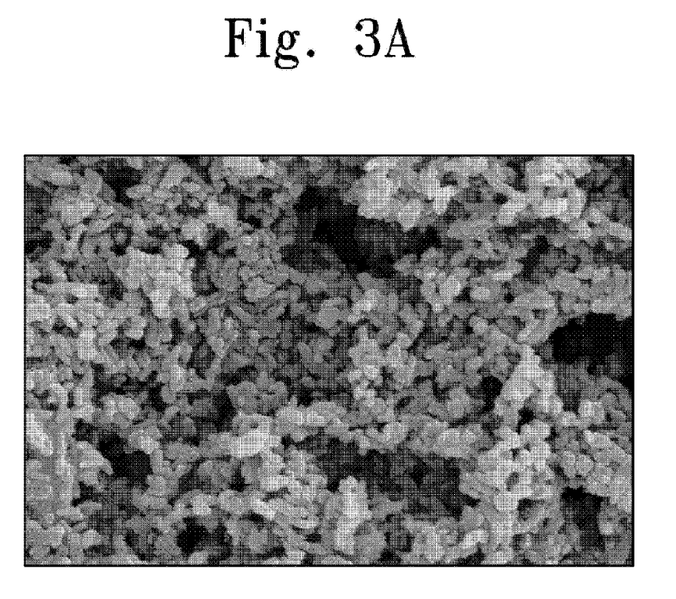
FIG. 3A and FIG. 3B show SEM photographs of coated organic pigments according to an exemplary embodiment of the present invention.
Figure 3B:
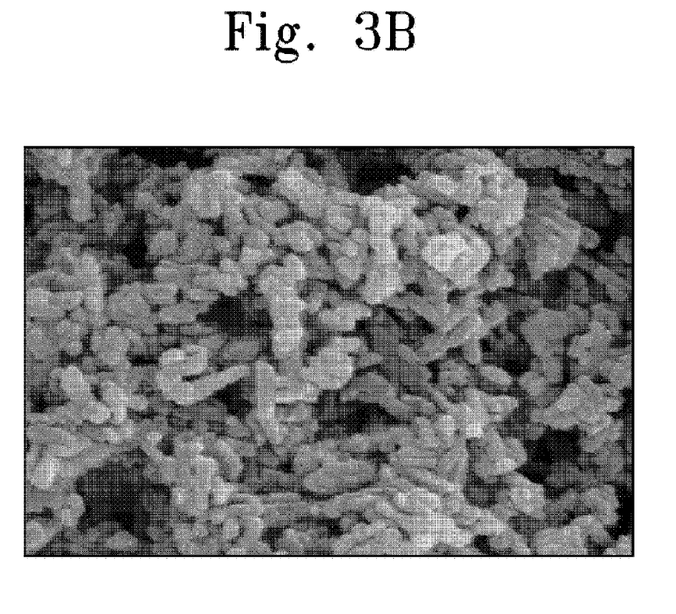

Referring to FIG. 2A, FIG. 2B, FIG. 3A, and FIG. 3B, the dispersion degree of coated organic pigments (or, coated color organic pigments) according to the exemplary embodiment of the present invention will be described with the dispersion degree of pure organic pigments. FIG. 2A and FIG. 2B show scanning electron micro-scope (SEM) photographs of the pure organic pigments according to an exemplary embodiment of the present invention, and FIG. 3A and FIG. 3B show SEM photographs of the coated organic pigments according to an exemplary embodiment of the present invention. The photographs shown in FIG. 2A, FIG. 2B, FIG. 3A, and FIG. 3B are taken by an S-4300 (Hitachi Ltd., Japan).

Referring to FIG. 2A, FIG. 2B, FIG. 3A, and FIG. 3B, the surface of the coated organic pigment is smoother than that of the pure organic pigment. In addition, the clear border between the coated organic pigments suggests an improved dispersion force.

Figure 4:
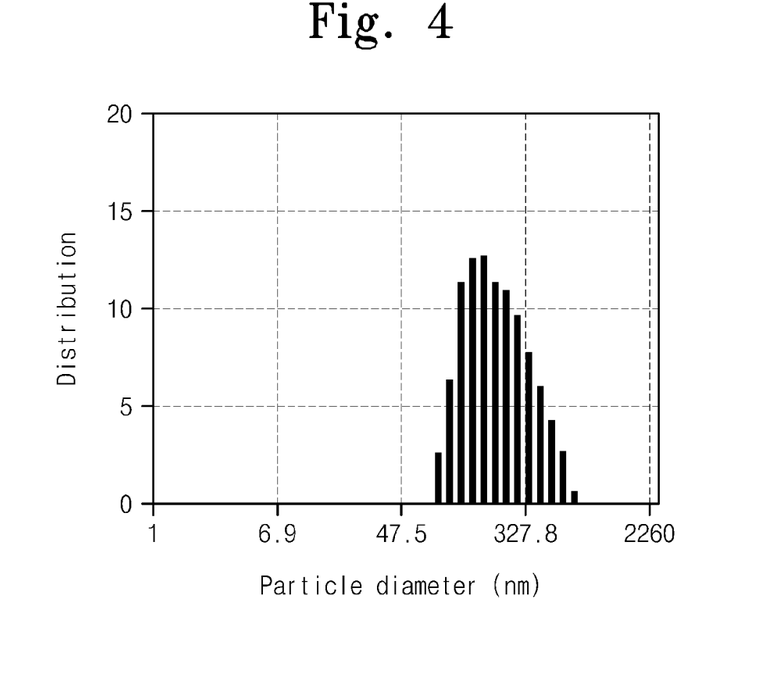
FIG. 4 is a graph showing the distribution of particle diameters of pure organic pigments according to an exemplary embodiment of the present invention.
Figure 5:
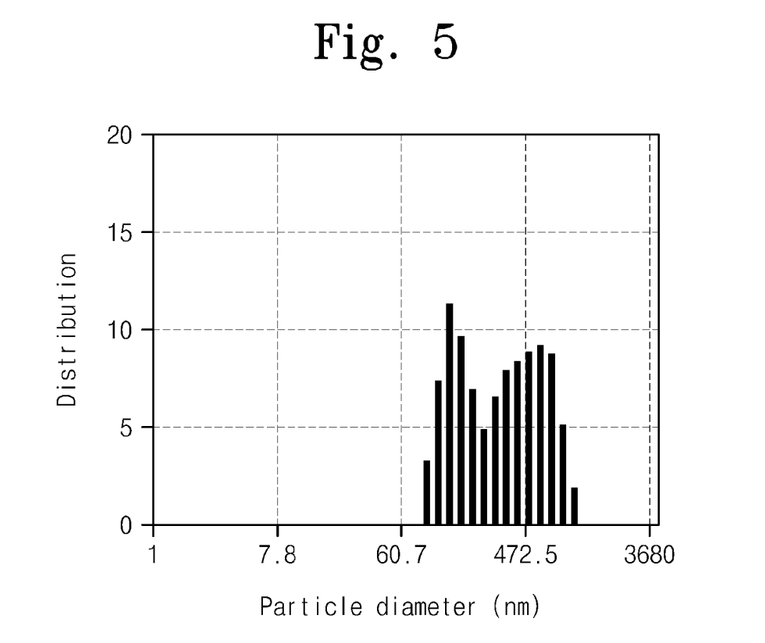
FIG. 5 is a graph showing the distribution of particle diameters of coated organic pigments according to an exemplary embodiment of the present invention.

In FIG. 4 and FIG. 5, the size of the pure organic pigment is compared with the size of the coated organic pigment. FIG. 4 is a graph showing the distribution of particle diameters of pure organic pigments, and FIG. 5 is a graph showing the distribution of particle diameters of coated organic pigments according to an exemplary embodiment of the present invention. The distribution of the particles diameters of the pure organic pigments and the coated organic pigments may be obtained through electrophoretic light scattering (ELS).

The thickness of the coating layer may be in the range of about 70 nm to about 80 nm. Although the size of the pure organic pigment (see, an X axis of the graph of FIG. 4) is dependent on the diameter of the specific particle, the size of the coated organic pigment is not solely dependent on the diameter of the specific particle. For example, adjacent pure organic pigment particles may aggregate resulting in a large particle diameter. The distribution of the coated organic pigments having a small particle diameter is greater that of the pure organic pigments (see Y axes of the graphs shown in FIG. 4 and FIG. 5). This represents that the aggregation between the coated organic pigments is reduced. Accordingly, the dispersibility of the coated organic pigments may be improved.

Figure 6:
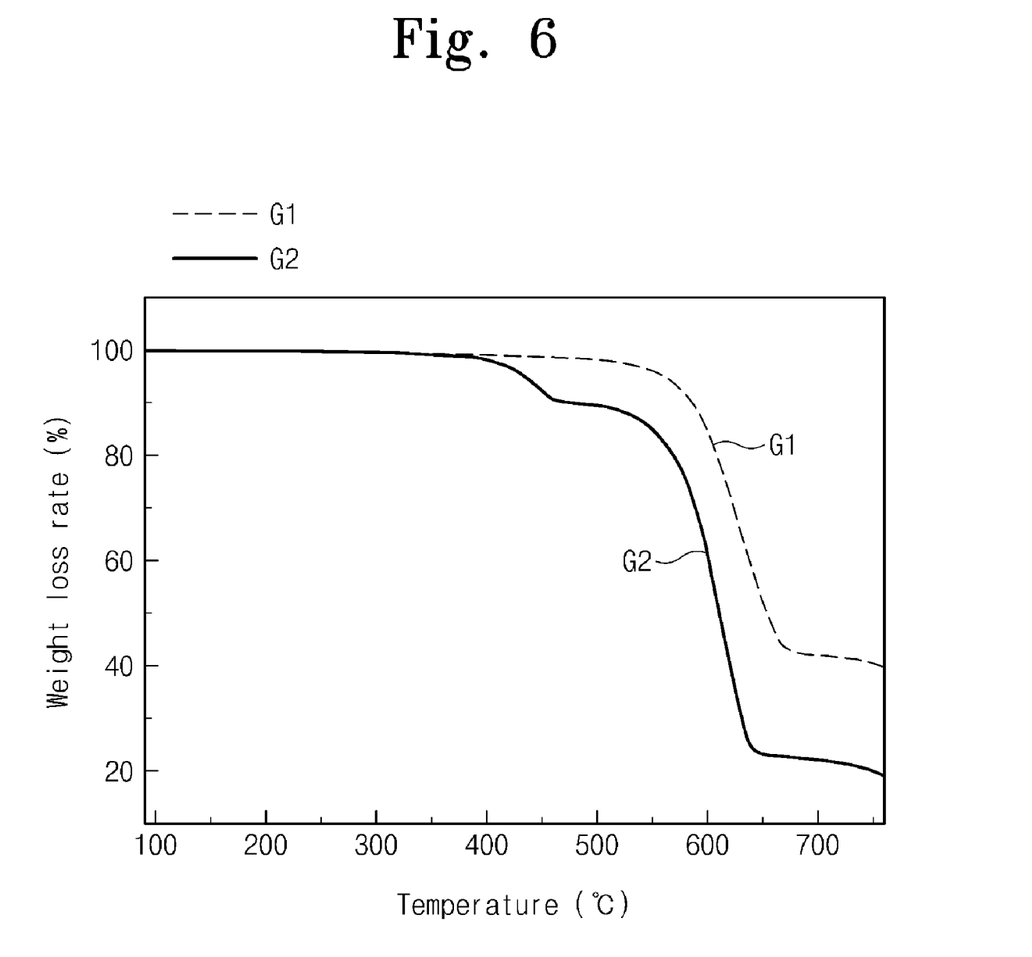
FIG. 6 is a view showing thermal gravity analysis of coated organic pigments according to an exemplary embodiment of the present invention.

FIG. 6 is a view showing thermal gravity analysis used to measure a coating degree of the coated organic pigment according to an exemplary embodiment of the present invention. The thermal gravity analysis represents a weight ratio of a material that is removed or burned when a predetermined material is heated. FIG. 6 shows a graph G2 representing the weight reduction of the coated organic pigment in comparison with a graph G1 representing the weight reduction of the pure organic pigment (not coated organic pigment). Although the graphs G1 and G2 for the pure organic pigment and the coated organic pigment show the similar characteristic, the weight difference between the pure organic pigment and the coated organic pigment occurs at a temperature of about 460° C. The weight difference between the pure organic pigment and the coated organic pigment should not exceed about 10%. The weight difference between the pure organic pigment and the coated organic pigment represents the weight of the coating layer. Accordingly, it may be determined whether the pigment is coated or not.

Hereinafter, an electrophoretic characteristic test of the coated color organic pigment according to an exemplary embodiment of the present invention will be described with reference to FIG. 7 and FIG. 8. In order to test the electrophoretic characteristic of the coated color organic pigment according to an exemplary embodiment of the present invention, a test cell is manufactured. Hereinafter, an experimental example for the coated organic pigment is compared with a comparative example for the pure organic pigment.

EXPERIMENTAL EXAMPLE

Figure 7:
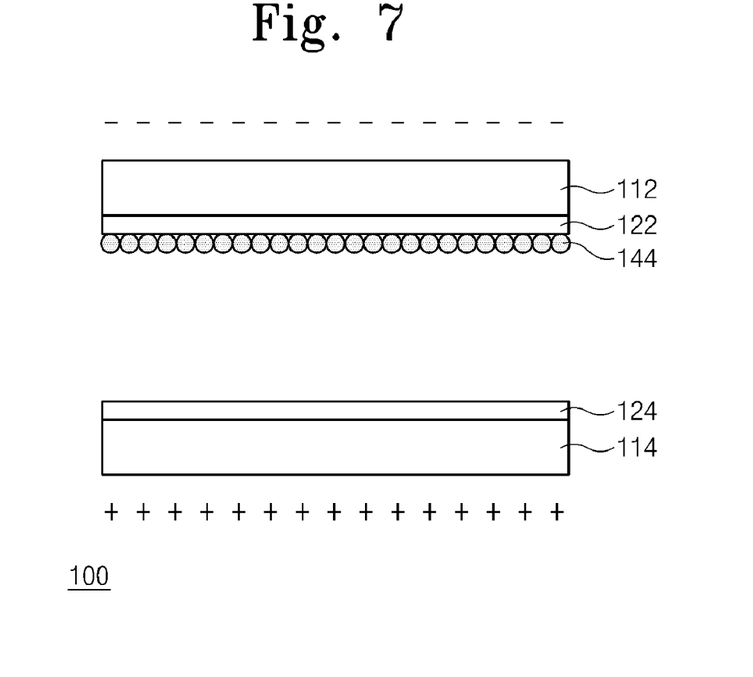
FIG. 7 is a schematic sectional view showing a test cell including coated organic pigments according to an exemplary embodiment of the present invention.

Referring to FIG. 7, a test cell 100 includes first and the second substrates 112 and 114 facing each other. The first and the second substrates 112 and 114 may be transparent glass substrates. First and second electrodes 122 and 124 are arranged on surfaces of the first and the second substrates 112 and 114, respectively. The first and the second electrodes 122 and 124 may be transparent electrodes including indium tin oxide (ITO).

An electrophoretic dispersion solution (not shown) including coated color organic pigments 144 is provided between the first and the second substrates 112 and 114. In addition, the electrophoretic dispersion solution may include an OLOA-based charge control agent. The coated color organic pigments 144 include color pigments and coating layers surrounding the color pigments. The coating layer includes a random co-polymer of styrene and 1-vinyl imidazole. The electrophoretic dispersion solution may be a mixture of a halogenated hydrocarbon-based material and an isopar-based material.

A negative voltage is applied to the first electrode 122 and a positive voltage is applied to the second electrode 124.

COMPARATIVE EXAMPLE

Figure 8:
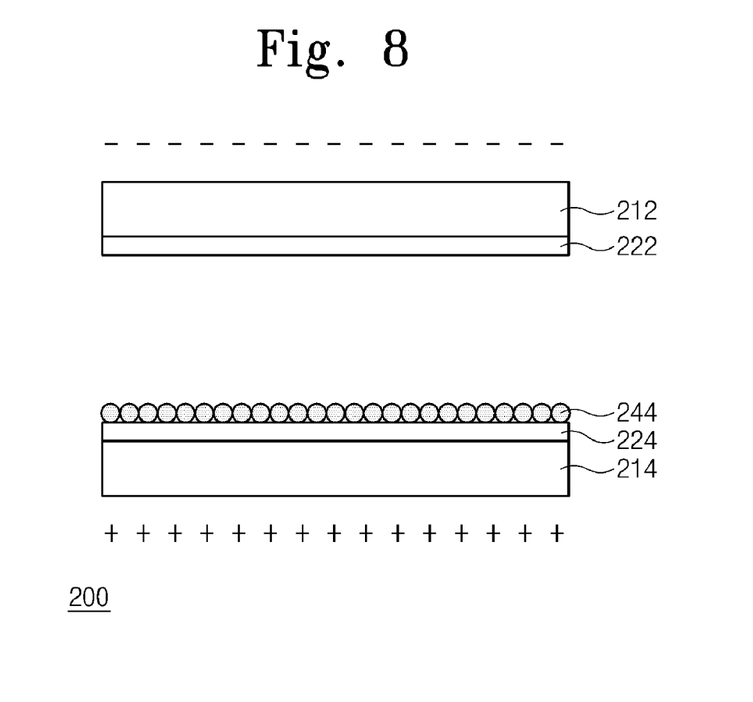
FIG. 8 is a schematic sectional view showing a test cell including pure organic pigments according to a comparative example.

Referring to FIG. 8, a test cell 200 includes first and second substrates 212 and 214 facing each other. The first and the second substrates 212 and 214 may be transparent glass substrates. The first and the second electrodes 222 and 224 are arranged on surfaces of the first and the second substrates 212 and 214, respectively. The first and the second electrodes 222 and 224 may be transparent electrodes including ITO.

An electrophoretic dispersion solution (not shown) including pure color organic pigments 244 is provided between the first and the second substrates 212 and 214. In addition, the electrophoretic dispersion solution may include an OLOA-based charge control agent. The electrophoretic dispersion solution may include the mixture of a halogenated hydrocarbon-based material and an isopar-based material.

A negative voltage is applied to the first electrode 222, and a positive voltage is applied to the second electrode 224.

Table 1 shows zeta potential of the coated organic pigments, which is measured in the experimental example according to exemplary embodiments of the present invention, and zeta potential of the pure organic pigments, which is measured in the comparative example. In addition, Table 1 shows the mobility of the coated organic pigments, which is measured in the experimental example, and mobility of the pure organic pigments, which is measured in the comparative example. The zeta potential and the mobility are measured using an ELS-8000 (Otsuka Electronics. Co., Japan).

TABLE 1

|  | Comparative Example Pure Organic Pigment | Experimental Example Coated Organic Pigment |
| --- | --- | --- |
| Zeta Potential | −15.86 mV | 16.21 mV |
| Mobility | $-3.506 \times 10^{-6}$ cm$^2$/Vs | $3.583 \times 10^{-6}$ cm$^2$/Vs |

Referring to FIG. 1, the zeta potential of the pure organic pigment in the comparative example has a negative value. In contrast, the zeta potential of the coated organic pigment in the experimental example has a positive value. In other words, the coated organic pigment according to an exemplary embodiment of the present invention may be positively charged due to the presence of vinyl-imidazole. The absolute value of the zeta potential of the coated organic pigment is greater than the absolute value of the zeta potential of the pure organic pigment. The mobility of the pigments is increased due to the increase of the absolute value of the zeta potential. Regarding the mobility, a negative sign or a positive sign represents the moving direction of the pigments. The direction of the coated organic pigment changes inversely to the moving direction of the pure organic pigment, and the mobility of the coated organic pigment is greater than that of the pure organic pigment. The response speed of a display device may be improved due to the increase of the mobility.

Figure 9:
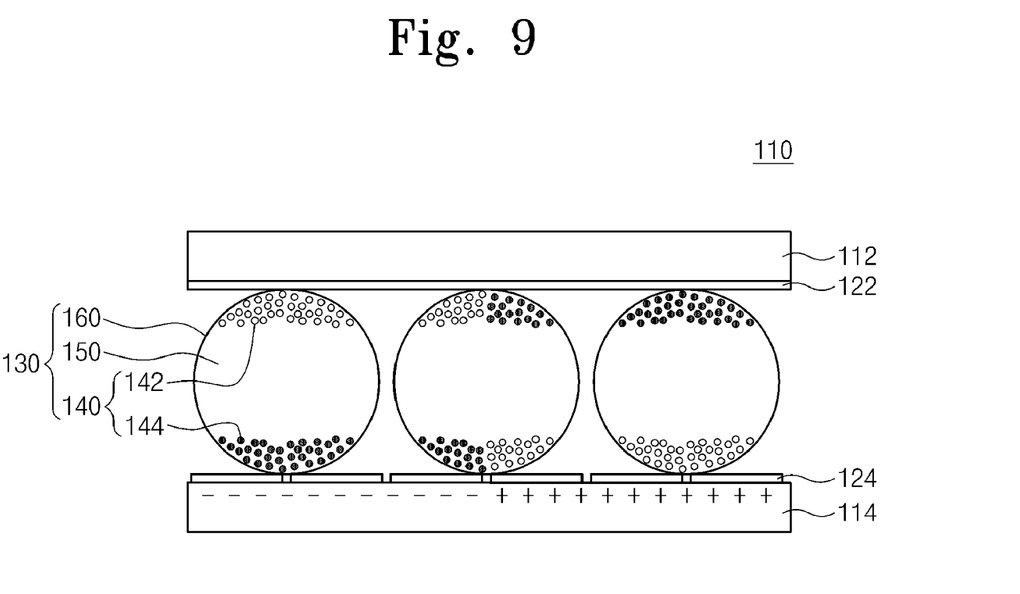
FIG. 9 is a schematic sectional view showing an electrophoretic display according to an exemplary embodiment of the present invention.

FIG. 9 shows an electrophoretic display 110 including the coated organic pigments according to an exemplary embodiment of the present invention With reference to FIG. 9, the electrophoretic display 110 includes the first and the second substrates 112 and 114 facing each other. The first and the second substrates 112 and 114 may each have the form of a sheet or a plate. The first and the second substrates 112 and 114 may have a thickness of hundreds of micrometers or less. The first and the second substrates 112 and 114 may include a rigid material and/or a flexible material. At least one of the first and the second substrates 112 and 114 may be transparent. For example, the first and the second substrates 112 and 114 may each include at least one of glass, polyethylene, polypropylene, modified polyolefin, polyamide, thermoplastic polyimide, polyphenylene oxide, polyphenylene sulfide, polycarbonate, poly methyl methacrylate, poly ether, poly ether imide, and poly acetal; thermoplastic elastomers based on styrene, polyolefin, poly vinyl chloride, polyurethane, polyester, polyamide, poly butadiene, transformer poly isoprene, fluororubber, and chlorinated polyethylene; co-polymers mainly consisting of the above; blends mainly consisting of the above; and a polymer alloy mainly consisting of the above.

The first and the second electrodes 122 and 124 may be arranged on opposing surfaces of the first and the second substrates 112 and 114, respectively. For example, the first electrode 122 may be a common electrode, and the second electrode 124 may be an individual electrode. According to the driving scheme, the first electrode 122 may be patterned similarly to the second electrode 124. At least one of the first electrode 122 and the second electrode 124 may be a transparent electrode, and the transparent electrode may be arranged on a transparent substrate. The display may be seen through the transparent substrate and the transparent electrode.

A plurality of micro-capsules 130 including pigments 140 may be arranged between the first and the second substrates 112 and 114. The micro-capsules 130 may be fixed by a filler layer (not shown) disposed between the first and the second substrates 112 and 114. For example, the filler layer may include an insulating material, and may insulate the first substrate 112 from the second substrate 114.

The micro-capsules 130 include the pigments 140, an electrophoretic dispersion solution 150, and a capsule body 160 containing the pigments 140 and the electrophoretic dispersion solution 150. In addition, the micro-capsules 130 may include one or more charge control agents (not shown). The pigments 140 may be dispersed in the electrophoretic dispersion solution 150 by the charge control agent. For example, the charge control agent may be an OLOA-based material, a BYK-based material, or a Span-based material.

The electrophoretic dispersion solution 150 may stably disperse the pigments 140 without dissolving the pigments 140. The electrophoretic dispersion solution 150 may be a non-polar fluid having an insulation property. The electrophoretic dispersion solution may be a non-polar organic solvent. For example, the electrophoretic dispersion solution 150 may be a halogenated hydrocarbon-based material, an isopar-based material, or a mixture of the halogenated hydrocarbon-based material and the isopar-based material.

The pigments 140 may include a first pigment 142 and a second pigment 144. The first pigment 142 may be a white pigment having a negative charge, and the second pigment 144 may be a color pigment. The second pigment 144 may include a color organic pigment and a coating layer surrounding the color organic pigment. The coating layer may include a co-polymer of styrene and a heterocyclic compound. The coating layer may be a random co-polymer of the styrene and the heterocyclic compound. The content of the heterocyclic compound of the coating layer may increase in an outward direction form the surface of the color pigment. The coating layer may be colorless and transparent, so that the color characteristic of the pigment can be sufficiently represented. The second pigment 144 may be positively charge due to the coating layer.

Voltages are applied to the first and the second electrodes 122 and 124, respectively, such that the first and the second pigments 142 and 144 may be selectively moved to realize a display device. For example, the second pigment 144 may be selectively moved such that an image of the electrophoretic display 110 may be displayed.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of preparing electrophoretic particles, the method comprising:
    providing a dispersion solution comprising an alcohol group;
    dispersing a pigment and a styrene monomer in the dispersion solution;
    polymerizing the styrene monomer on a surface of the pigment; and
    adding a heterocyclic compound monomer to the dispersion solution while polymerizing the styrene monomer and the heterocyclic compound monomer on the surface of the pigment.

2. The method of claim 1, wherein the heterocyclic compound monomer comprises a nitrogen-containing compound.

3. The method of claim 2, wherein the heterocyclic compound monomer is at least one of imidazole, pyrrolidone, imide, piperidine, pyridine, pyrrole, puran, thiophene, pyrazole, and pyrazine.

4. The method of claim 3, wherein the imidazole is 1-vinyl imidazole.

5. The method of claim 2, wherein the electrophoretic particles are positively charged by the heterocyclic compound.

6. The method of claim 1, wherein the styrene monomer and the heterocyclic compound monomer are provided together with a polymerization initiator.

7. The method of claim 6, wherein the polymerization initiator comprises a radical initiator and initiates a polymerization reaction at or below a boiling point of the dispersion solution.

8. The method of claim 7, wherein the polymerization initiator comprises azobisisobutylonitrile (AIBN) and has a weight ratio in a range of 0.1 weight % to 0.5 weight % based on the dispersion solution.

9. The method of claim 1, further comprising dispersing a stabilizer in the dispersion solution, before dispersing the styrene monomer.

10. The method of claim 9, wherein the stabilizer comprises a succinimide-based material.

11. The method of claim 10, wherein the stabilizer comprises polyvinylpyrrolidone, and has a weight ratio in a range of 1 weight % to 10 weight % based on the dispersion solution.

12. An electrophoretic display, comprising:
    substrates facing each other;
    an electrode arranged on each substrate;
    a micro-capsule provided between the substrates; and
    a plurality of electrophoretic particles contained in the micro-capsule,
    wherein each electrophoretic particle comprises a coating layer comprising a polymerized heterocyclic compound monomer, and a pigment coated with the coating layer.

13. The electrophoretic display of claim 12, wherein the coating layer comprises a co-polymer of styrene and heterocyclic compound.

14. The electrophoretic display of claim 13, wherein the heterocyclic compound comprises a nitrogen-containing compound.

15. The electrophoretic display of claim 14, wherein the heterocyclic compound comprises at least one selected of imidazole, pyrrolidone, imide, piperidine, pyridine, pyrrole, puran, thiophene, pyrazole, and pyrazine.

16. The electrophoretic display of claim 15, wherein the imidazole is 1-vinyl imidazole.

17. The electrophoretic display of claim 16, wherein the electrophoretic particles are positively charged by the heterocyclic compound.

18. The electrophoretic display of claim 12, wherein the coating layer comprises a polymerized dispersion.

* * * * *